(12) United States Patent
Matsufuji et al.

(10) Patent No.: US 8,305,475 B2
(45) Date of Patent: Nov. 6, 2012

(54) SOLID-STATE IMAGE SENSING DEVICE AND IMAGE SIGNAL OUTPUT CIRCUIT

(75) Inventors: Teruo Matsufuji, Tokyo (JP); Ken Matsumoto, Kanagawa (JP); Akihiko Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/516,549

(22) PCT Filed: Sep. 29, 2008

(86) PCT No.: PCT/JP2008/067639
§ 371 (c)(1),
(2), (4) Date: May 27, 2009

(87) PCT Pub. No.: WO2009/044700
PCT Pub. Date: Apr. 9, 2009

(65) Prior Publication Data
US 2010/0026867 A1   Feb. 4, 2010

(30) Foreign Application Priority Data
Oct. 1, 2007   (JP) ................................ 2007-258161

(51) Int. Cl.
*H04N 3/14* (2006.01)
*H04N 5/335* (2011.01)
(52) U.S. Cl. ....................................... 348/312; 348/294
(58) Field of Classification Search .................. 348/294, 348/312
See application file for complete search history.

(56) References Cited

U.S. PATENT DOCUMENTS

| 5,521,637 A | 5/1996 | Asaida et al. |
| 2005/0062864 A1* | 3/2005 | Mabuchi ........................ 348/294 |
| 2009/0009641 A1* | 1/2009 | Asayama et al. ............. 348/294 |

FOREIGN PATENT DOCUMENTS

| EP | 0 520 759 | 12/1992 |
| EP | 0 905 975 | 3/1999 |
| JP | 09-181964 | 7/1997 |
| JP | 2003-143616 | 5/2003 |
| JP | 2006-303752 | 11/2006 |
| JP | 2007-019583 | 1/2007 |

* cited by examiner

*Primary Examiner* — Jordan Schwartz
(74) *Attorney, Agent, or Firm* — Robert J. Depke; Rockey, Depke & Lyons, LLC

(57) ABSTRACT

A solid-state image sensor element outputs either n bits or in a bit number of an integral multiple of n in synchronization with an output clock. An allocating unit allocates respective bit data of pixel signals obtained by the solid-state image sensor element into at least two series of bit data alternately, in synchronization with a clock converted by a clock converting unit. A first selector selects an output from the bit data allocated by the allocating unit and the bit data not allocated by the allocating unit. A second selector selects an output from a clock with a frequency converted by the clock converting unit and a clock with a frequency not converted by the clock converting unit.

2 Claims, 8 Drawing Sheets

[FIG.1]
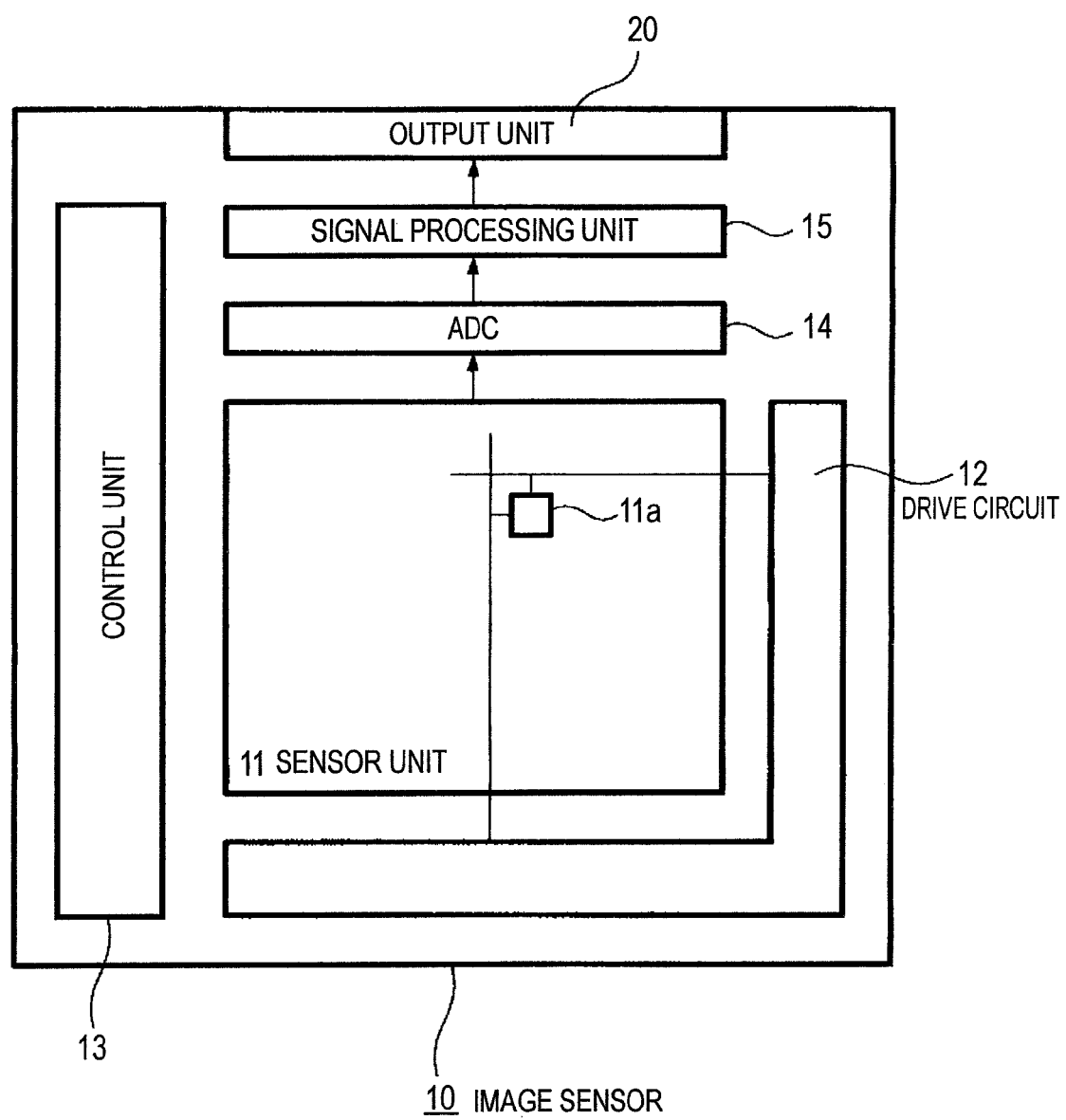

[FIG.2]
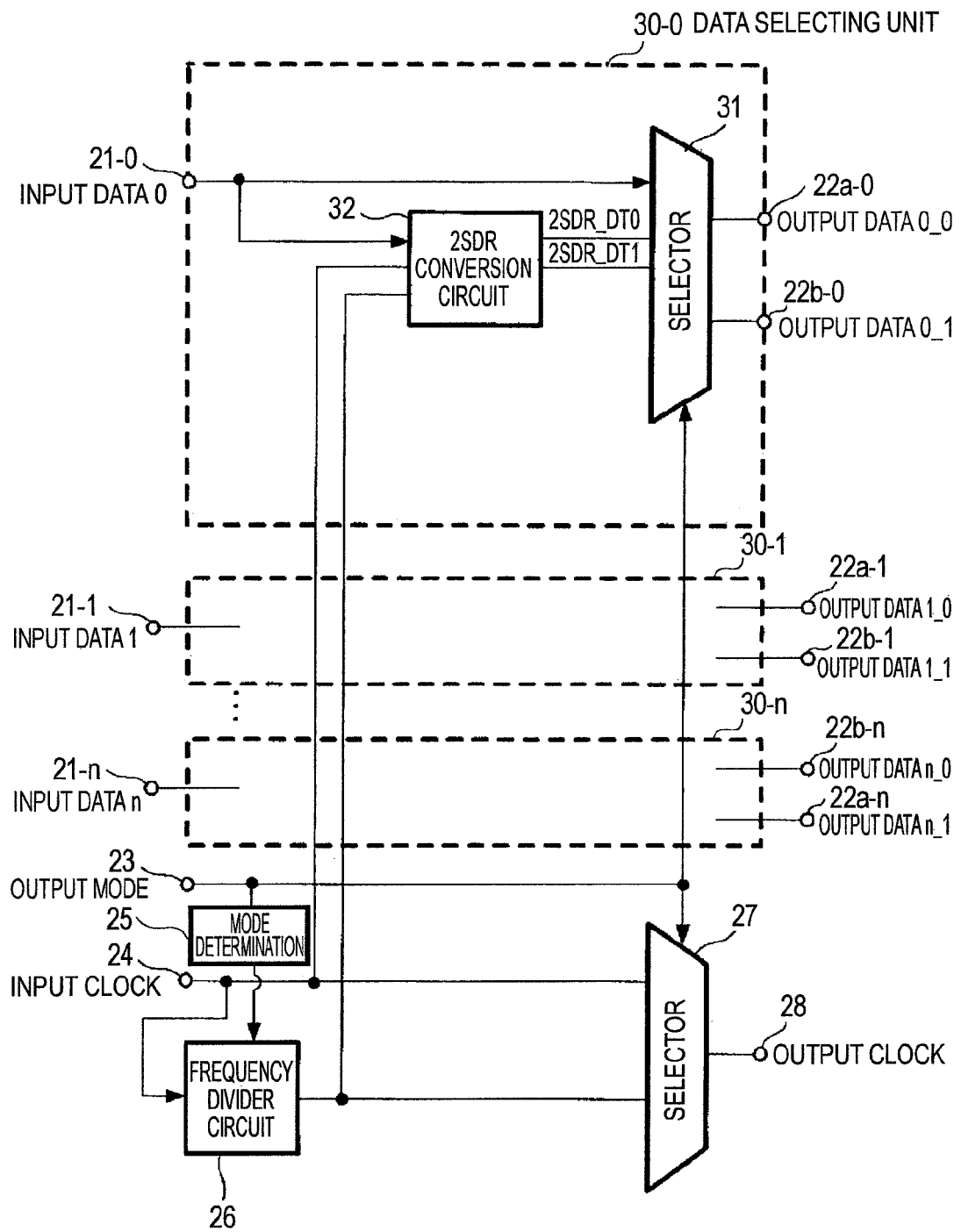

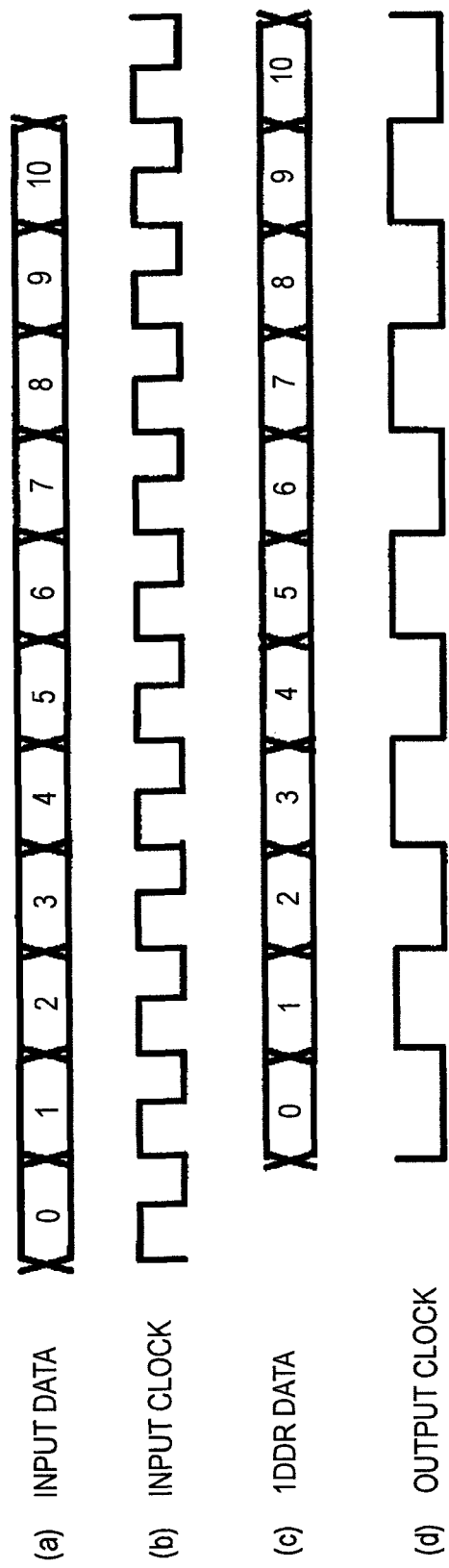
[FIG.3]

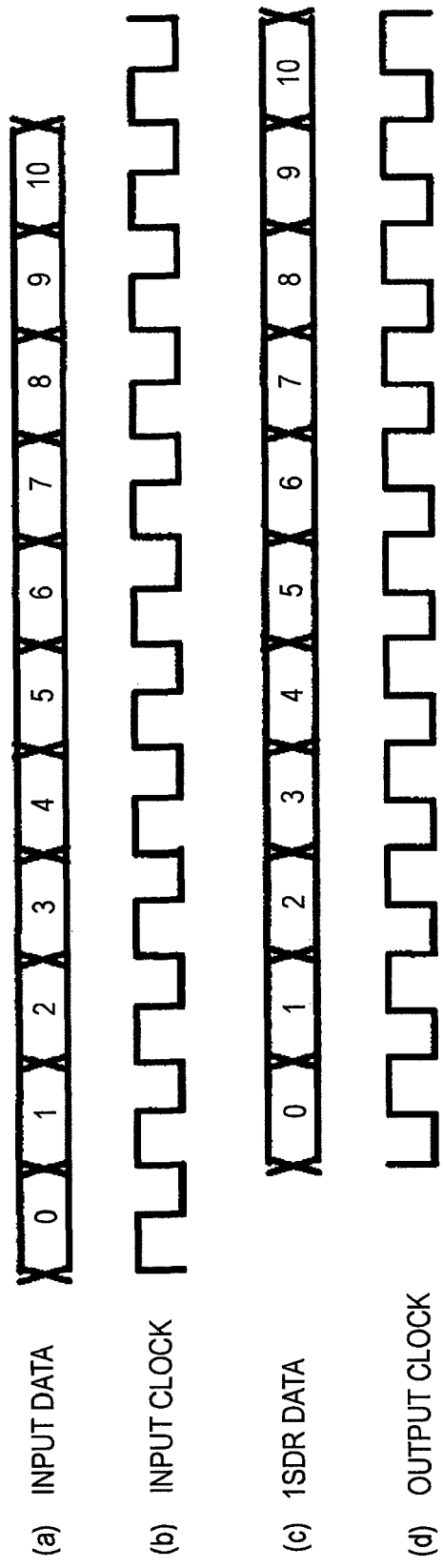
[FIG.4]

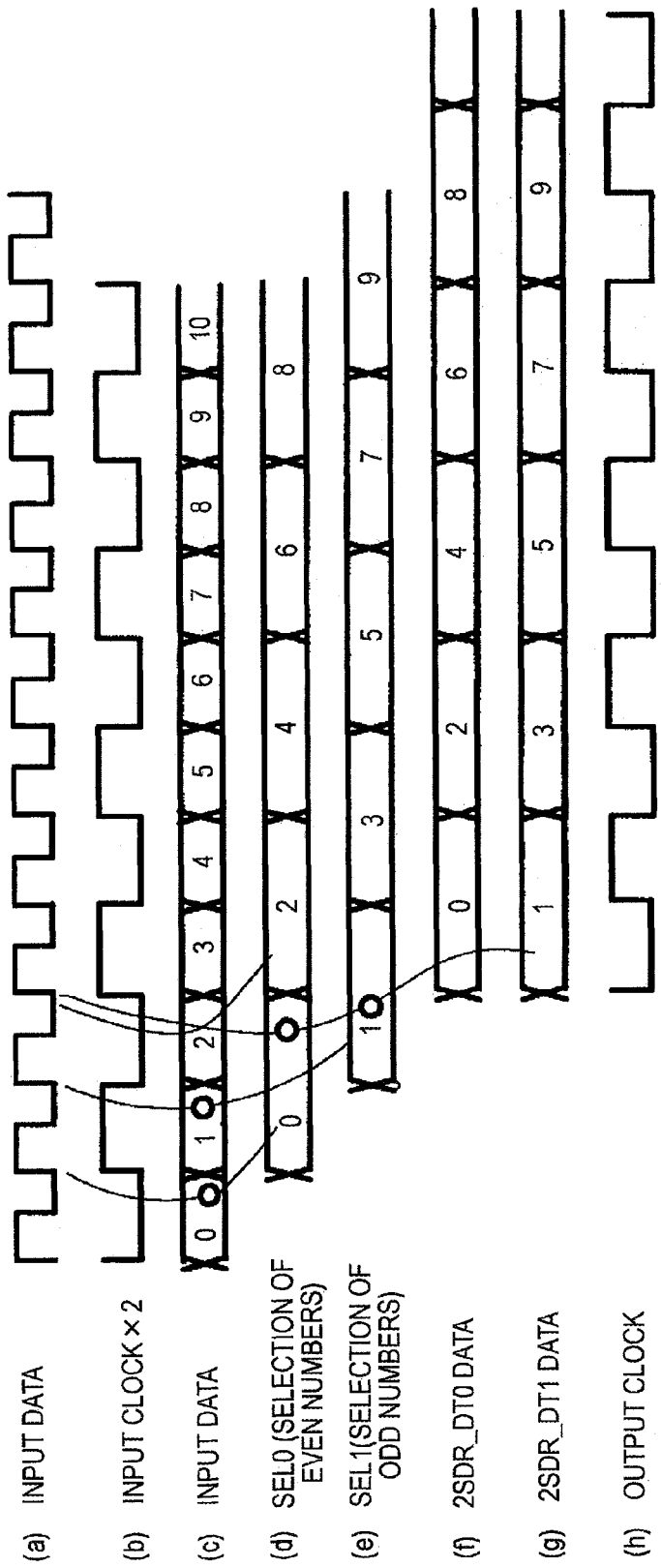
[FIG.5]

[FIG.6]
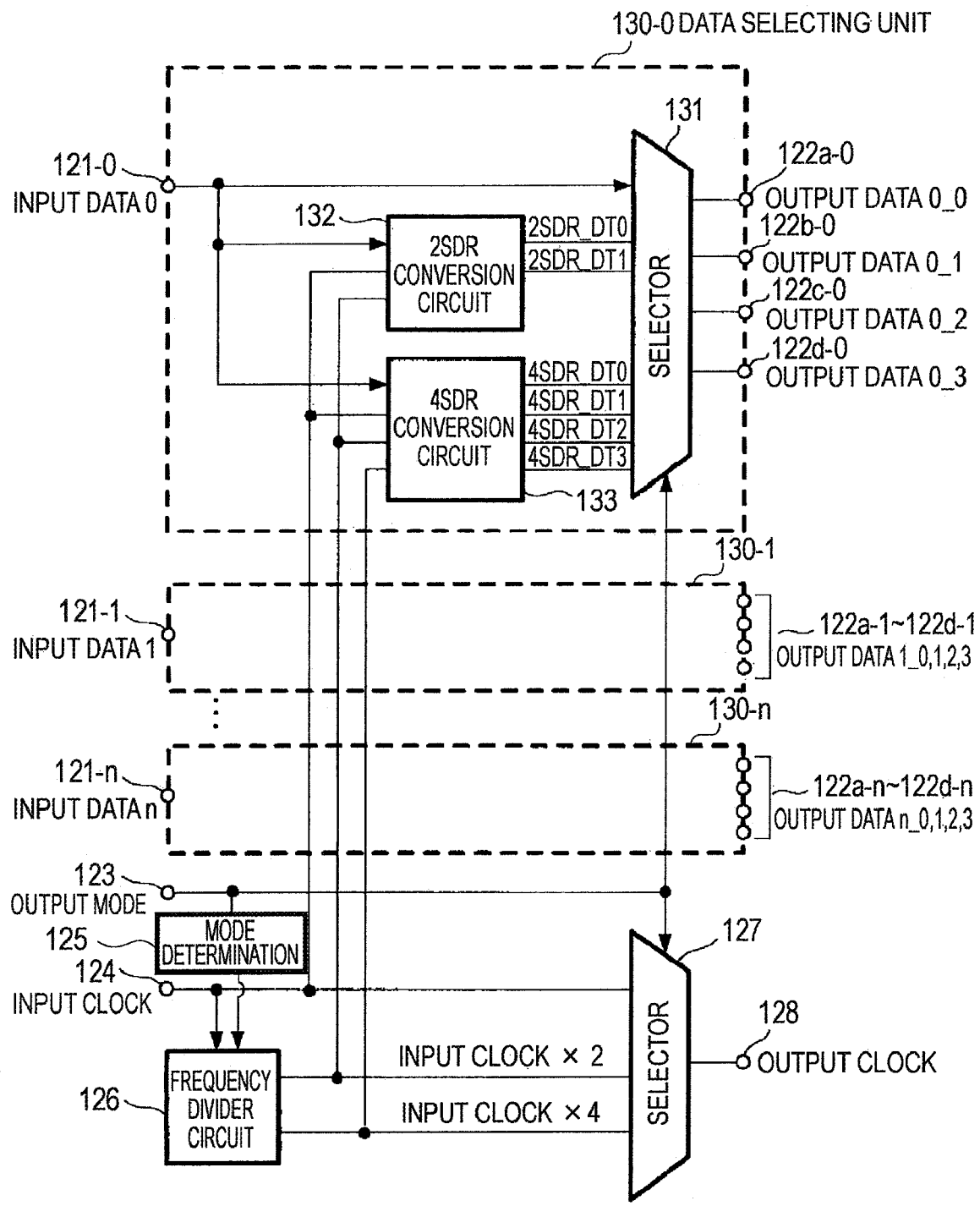

[FIG.7]
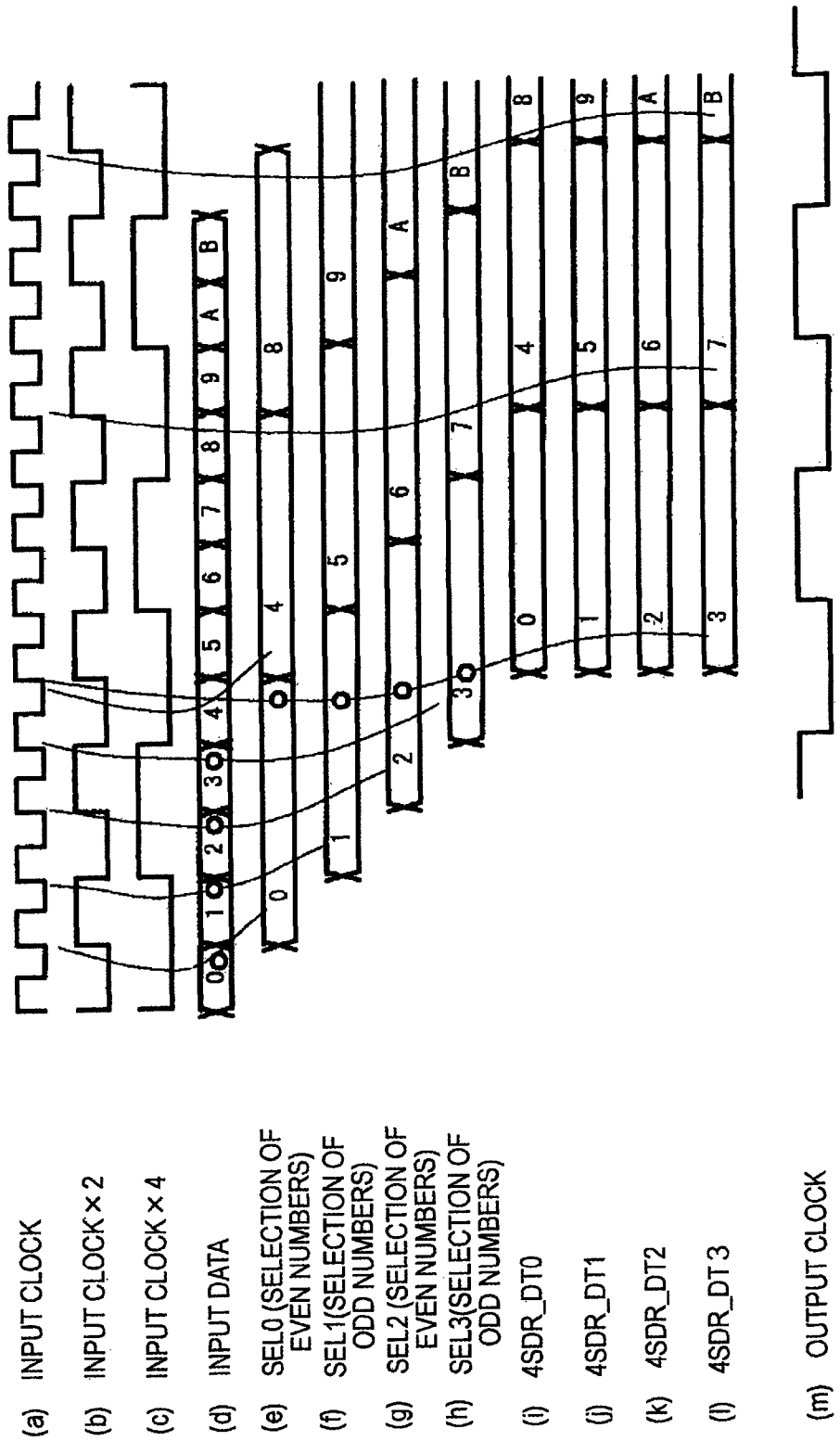
(a) INPUT CLOCK
(b) INPUT CLOCK×2
(c) INPUT CLOCK×4
(d) INPUT DATA
(e) SEL0 (SELECTION OF EVEN NUMBERS)
(f) SEL1 (SELECTION OF ODD NUMBERS)
(g) SEL2 (SELECTION OF EVEN NUMBERS)
(h) SEL3 (SELECTION OF ODD NUMBERS)
(i) 4SDR_DT0
(j) 4SDR_DT1
(k) 4SDR_DT2
(l) 4SDR_DT3
(m) OUTPUT CLOCK

[FIG.8]
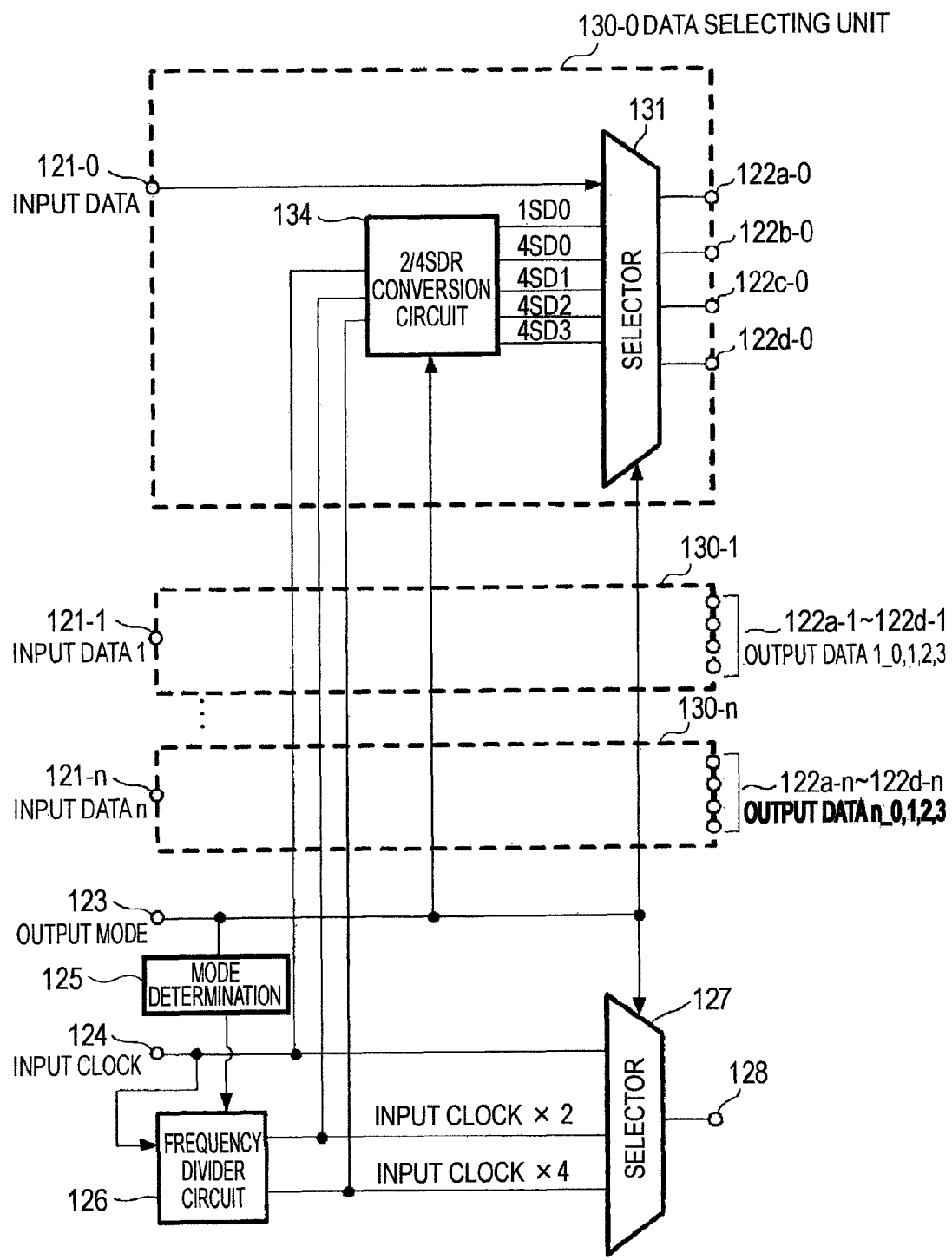

SOLID-STATE IMAGE SENSING DEVICE AND IMAGE SIGNAL OUTPUT CIRCUIT

This application is a 371 U.S. National Stage filing of PCT/JP2008/067639, filed Sep. 29, 2008, which claims priority to Japanese Patent Application Number 2007-258161 filed Oct. 1, 2007, all of which are incorporated herein by reference.

TECHNICAL FIELD

The present invention relates to a solid-state image sensing device comprising a solid-state image sensor element and outputting a pixel signal obtained by the image sensor element, and an image signal output circuit provided in the solid-state image sensing device.

BACKGROUND ART

As the semiconductor process technology has advanced, the number of pixels in solid-state image sensor elements formed on a semiconductor substrate, such as CMOS (Complementary Metal Oxide Semiconductor) image sensors and CCD (Charge Coupled Device) image sensors, has tended to increase. When the number of the pixels increases, the amount of data required for outputting the image signal per one frame increases correspondingly.

It is possible to increase the amount of data for outputting an image signal per one frame period, for example, by increasing the frequency of the pixel clock for outputting a signal for one pixel (pixel signal) of the image signal and outputting the data in synchronization with the pixel clock. The pixel signal for one pixel is data of a predetermined bit number, for example, from 8 bits to about a dozen bits. The pixel data of that bit number are output in synchronization with a pixel clock.

However, if the frequency of the pixel clock is increased to shorten the cycle for outputting the pixel signal, it is possible that the circuit for receiving the image signal that is in the camera that incorporates the solid-state image sensing device may not be able to handle the image signal since the image signal is transferred at a very high transfer rate.

For this reason, it is commonplace to lower the transfer rate by increasing the bit number for outputting the pixel signal for one pixel.

For example, the following configuration is common. In the case that one pixel is constituted by 8 bits, 8 terminals are provided for outputting the 8-bit pixel data, and the configuration is such that the 8-bit pixel data are output from the 8 terminals in parallel. The pixel data for one pixel are output for one cycle (or half cycle) of the pixel clock.

In addition, to lower the transfer rate by reducing the frequency of the pixel clock, 16 output terminals are provided and the terminal for outputting for one pixel is allocated into two terminals so that the transfer rate can be halved. When the transfer rate can be halved, the frequency of the transfer clock used for receiving the signal by the circuit on the side that receives the image signal can be lowered correspondingly, so the burden on the circuit is reduced correspondingly.

When merely halving the transfer rate is insufficient, it is necessary to lower the frequency of the transfer clock further by increasing the number of the output terminals further to allocate the data into a greater number of terminals.

JP-A-2007-19583, which is published by Japan Patent Office, discloses an example of the process configuration for reducing the transfer rate of the image pixel signal.

However, a problem arises when a plurality of solid-state image sensing device with different transfer rates are prepared corresponding to the transfer rate that can be received by the circuit of the camera apparatus in which the solid-state image sensing device are incorporated; that is, a correspondingly large number of different types of solid-state image sensing device are required.

Other than the transfer rate, various modes exist as the output modes for image signal, such as the case that data for one pixel are output during one cycle of the pixel clock and the case that data for one pixel are output during half a cycle. From the viewpoint that a solid-state image sensing device is required for each of the output modes also, the number of types of the required solid-state image sensing device becomes larger.

The invention has been accomplished in view of such circumstances. It is an object of the invention to make it possible to handle various types of output modes of pixel signals with one solid-state image sensing device.

DISCLOSURE OF THE INVENTION

The invention is applied to a solid-state image sensing device for outputting a pixel signal obtained by imaging with a solid-state image sensor element and having a bit number of n bits or an integral multiple of n bits (where n is an integer), in synchronization with an output clock.

The device comprises, as its components, a clock converting unit, an allocating unit, a first selector, a second selector, and an output mode control unit.

The clock converting unit converts a clock into a clock having a frequency of at least ½ times.

The allocating unit allocates respective bit data of pixel signal, obtained by imaging using the solid-state image sensor element, into at least two series of bit data alternately, in synchronization with the clock converted by the clock converting unit.

The first selector selects an output between the bit data that have been allocated by the allocating unit and the bit data that have not been allocated by the allocating unit.

The second selector selects an output between a clock having a frequency that has been converted by the clock converting unit and a clock having a frequency that has not been converted by the clock converting unit.

The output mode control unit specifies output modes at the first and second selectors.

Thereby, pixel signals output at the same transfer rate can be output in synchronization with clocks having different frequencies.

Such a configuration makes it possible to select the pixel signal that is output from the solid-state image sensing device in synchronization with the clock between a pixel signal of n bits and a pixel signal of an integral multiple of n, by selecting the outputs at the first selector. Thus, it is possible to select the transfer rate of the output pixel signal according to the selection of the output bit number. As for the clock synchronized with the pixel signal as well, it is possible to select a clock with a necessary frequency by the selection at the second selector.

According to the invention, the following advantageous effects are exhibited. The transfer rate of the output pixel signal can be selected with one solid-state image sensing device, so the device is allowed to handle the transfer rate that can be received by the circuit that receives the pixel signal (such as a circuit in a camera). Accordingly, high the versatility of the solid-state image sensing device can be enhanced.

In this case, the configuration can be achieved by preparing an allocating unit for allocating pixel signals and a clock converting unit for preparing a clock corresponding to a transfer rate, and making selections of the respective outputs. Thus, the invention can be achieved with a simple configuration.

BRIEF DESCRIPTION OF THE DRAWINGS

FIG. 1 is a functional block diagram showing a solid-state image sensing device according to an example of a first embodiment of the invention.

FIG. 2 is a configuration diagram showing an example of a pixel signal output unit of the solid-state image sensing device according to the example of the first embodiment of the invention.

FIG. 3 is a timing chart showing an example of the output timing (1DDR output) of the pixel signal output unit of the example shown in FIG. 2.

FIG. 4 is a timing chart showing an example of the output timing (1SDR output) of the pixel signal output unit of the example shown in FIG. 2.

FIG. 5 is a timing chart showing an example of the output timing (2SDR outputs) of the pixel signal output unit of the example shown in FIG. 2.

FIG. 6 is a configuration diagram showing an example of a pixel signal output unit of a solid-state image sensing device according to an example of a second embodiment of the invention.

FIG. 7 is a timing chart showing an example of the output timing (4SDR outputs) of the pixel signal output unit of the example shown in FIG. 6.

FIG. 8 is a configuration diagram showing a pixel signal output unit of a modified example of the second embodiment of the invention.

BEST MODE FOR CARRYING OUT THE INVENTION

Hereinbelow, an example of a first embodiment of the present invention will be described with reference to FIGS. 1 through 5.

This embodiment is an embodiment in which the invention is applied to a solid-state image sensing device in which a CMOS image sensor is used as an image sensor (solid-state image sensor element). The solid-state image sensing device of this embodiment is incorporated and used in various imaging apparatus such as video cameras and digital still cameras.

FIG. 1 is a functional block diagram of the solid-state image sensing device of this embodiment. In FIG. 1, the entire solid-state image sensing device is referred to as an image sensor. In the following description, a pixel signal refers to a signal of one pixel unit of the image signal obtained by imaging with the image sensor.

An image sensor 10 of the example of this embodiment has a sensor unit 11 in which pixels 11a each serving as a signal light-receiving unit are arrange in matrix. In order to the optical signal received by the sensor unit 11, a drive signal is supplied from a drive circuit 12 to the sensor unit 11 with controlling of a control unit 13. The signals (image signals) accumulated in the pixels 11a of the sensor unit 11 are read out from the sensor unit 11 sequentially, one horizontal line of the signals at a time, and are supplied to an analog/digital converter (ADC) 14.

The analog/digital converter 14 converts the supplied image signals into digital signals by a unit of the pixel signal for one pixel, and supplies the converted pixel signal to a signal processing unit 15. The signal processing unit 15 performs various image signal processing such as gain controlling. The processed image signals are output from an output unit 20. This output unit 20 outputs a video signal for performing recording and displaying, in the case of an imaging apparatus such as a video camera. The description of the circuit configuration after the output unit 20 will be omitted.

In the case of this example, the image sensing device employs a configuration in which the pixel signal for one pixel is converted into a digital pixel signal of 12 bits by the analog/digital converter 14, and with the pixel signal of 12 bits being one unit, the pixel signals are output in parallel from the output unit 20. When the signal is output from the output unit 20, a pixel clock synchronized with the output timing for each one pixel is output at the same time, and the pixel clock is generated within the image sensor 10.

The example of this embodiment employs a configuration in which the output format (output mode) of the pixel signal from the output unit 20 can be selected from a 1DDR output mode, a 1SDR output mode, and a 2SDR output mode. Herein, DDR is an abbreviation of double data rate, and SDR is an abbreviation of single data rate.

The 1DDR output mode is a mode of an output format in which the pixel signal of 12 bits per one pixel is output from 12 output ports respectively, one bit by one bit, at every half cycle of the pixel clock. This mode corresponds to the later-described output state of FIG. 3.

The 1SDR output mode is a mode of an output format in which the pixel signals of 12 bits per one pixel is output from 12 output ports respectively, one bit by one bit, at every one cycle of the pixel clock. This mode corresponds to the later-described output state of FIG. 4.

The 2SDR output mode is a mode of an output format in which the pixel signal of 12 bits per one pixel is allocated to 24 output ports and output therefrom, one bit by one bit, at every ½ cycle of the original pixel clock. This mode corresponds to the later-described output state of FIG. 5.

FIG. 2 is a diagram showing the configuration of the output unit 20 of this embodiment.

Referring to FIG. 2, input terminals 21-0 to 21-n (n is the integer corresponding to the bit number) are the terminals to which the pixel signals are supplied from the signal processing unit 15(FIG. 1) in the image sensor 10. In this example, the pixel signal for one pixel is composed of 12 bits; therefore, n is 11, and 12 input terminals 21-0 to 21-11 are provided. A signal of 1 bit position of the pixel signal for one pixel is supplied sequentially to each of the input terminals 21-0 to 21-n.

The pixel signals obtained at the input terminals 21-0 to 21-n are subjected to a conversion process and a selection process in data selecting units 30-0 to 30-n. Although only the configuration of the data selecting unit 30-0 is shown in FIG. 2, the other data selecting units 30-1 to 30-n also have the same configuration.

The configuration of the data selecting unit 30-0 is as follows. The pixel signal obtained at the input terminal 21-0 is supplied to a selector 31 and a 2SDR conversion circuit 32. The 2SDR conversion circuit 32 is a conversion circuit that functions as an allocating unit for alternately allocating the supplied pixel signals sequentially, one bit by one bit, into two series of bit data 2SDR_DT0 and 2SDR_DT1 so that the supplied pixel signals are converted into 2SDR output format signals. Specific examples of the conversion operation in the conversion circuit 32 will be described later when explaining the timing chart (FIG. 5).

The two series of bit data 2SDR_DT0 and 2SDR_DT1 allocated by the 2SDR conversion circuit 32 are supplied to the selector 31.

The selector 31 has two output ports 22*a*-0 and 22*b*-0. Each of the two output ports 22*a*-0 and 22*b*-0 is an output port that is provided for the image sensor (solid-state image sensing device) 10. In FIG. 2, a first series of output ports of the data selecting units 30-0 to 30-n are denoted as output ports 22*a*-0, 22*a*-1 . . . and 22*a*-n, respectively, while a second series of output ports of the data selecting units 30-0 to 30-n are denoted as output ports 22*b*-0, 22*b*-1, . . . and 22*b*-n, respectively.

When the 1DDR output mode or the 1SDR output mode is selected as the output mode, only the first-series of output ports 22*a*-0 to 22*a*-n are used to output the pixel signals. When the 2SDR output mode is selected as the output mode, both the first series of output ports 22*a*-0 to 22*a*-n and the second series of output ports 22*b*-0 to 22*b*-n are used to output the pixel signals. In the selector 31, when adjustment of the output timing is necessary, a process for adjusting the output timing of the pixel signals by delay or the like is performed as needed.

Selection of these output modes is controlled by a signal obtained at an output-mode-specifying-signal input terminal 23. Specifically, an output mode specifying signal obtained at the input terminal 23 is supplied to the selector 31 of each of the data selecting units 30-0 to 30-n so that the signal of the corresponding mode can be output. In the case of this example, one output mode among the three output modes is selected, so the output mode specifying signal obtained at the input terminal 23 is constituted by a signal of 2 bits. It should be noted that the output mode specifying signal obtained at the input terminal 23 is generated by the current output mode that is set at the control unit 13 in the image sensor 10. However, it is possible to employ a configuration in which a signal for determining the output mode may be supplied directly to the input terminal 23 from a control unit external to the image sensor 10.

This embodiment employs a configuration in which a pixel clock is output from an output port 28 in synchronization with the outputs from the respective output ports of the pixel signals.

Accordingly, a clock input terminal 24, to which the pixel clock is supplied from the pixel clock generating unit (not shown) in the image sensor 10, is provided, and the pixel clock is supplied to a frequency divider 26 so that it is converted into a clock having ½ the frequency. The frequency division operation of the frequency divider 26 is performed based on the result obtained by identifying the output mode specifying signal obtained at the input terminal 23 using a mode identifying unit 25. Specifically, the frequency divider 26 is allowed to operate only in the case that the mode identifying unit 25 determines that the output mode is an output mode that requires the clock having ½ the frequency. Alternatively, the frequency divider 26 may be allowed to operate at all times.

Then, a selector 27 makes a selection between a mode of outputting the clock obtained at the clock input terminal 24 from the output port 28 as it is and a mode of outputting the clock whose frequency is divided into ½ by the frequency divider 26 from the output port 28. The selection by the selector 27 is performed based on the output mode specifying signal obtained at the input terminal 23.

Next, examples of the output states in the respective output modes are described with reference to the timing charts of FIGS. 3 through 5.

First, an example in which a signal is output using the 1DDR output mode is described with reference to FIG. 3. The 1 DDR output mode is a mode of an output format in which the pixel signal of 12 bits per one pixel is output from 12 output ports respectively, one bit by one bit, at every half cycle of the pixel clock.

Specifically, as shown in FIG. 3(*a*), the output of one bit of a pixel signal that is constituted by predetermined bits (n+1) bits, such as 12 bits, is supplied in such a-manner that data 0, data 1, data 2, data 3, . . . , etc. are supplied sequentially, one bit per one pixel, to each of the input terminals 21-0 to 21-n.

Then, in synchronization with this pixel signal, a pixel clock is supplied to the input terminal 24, as shown in FIG. 3(*b*). This pixel clock indicated by FIG. 3(*b*) is a clock of 1 cycle per 1 pixel.

When such a pixel signal is input into the output unit 20 in the state where the 1DDR output mode is set, the pixel signals obtained at the input terminals 21-0 to 21-n are selected by the selector 31 so as to be: output from the first series of output ports 22*a*-0 to 22*a*-n, as shown in FIG. 3(*c*). It should be noted that the timing is delayed by one pixel in the example of FIG. 3(*c*).

Then, the pixel clock that is output from the output port 28 is selected by the selector 27 so that the clock whose frequency is divided into ½ by the frequency divider 26 is output, as shown in FIG. 3(*d*). In this example, the pixel data change in association with the rise and fall of the clock, as shown in FIGS. 3(*c*) and 3(*d*).

Next, an example in which a signal is output using the 1SDR output mode is described with reference to FIG. 4. The 1SDR output mode is a mode of an output format in which the pixel signal of 12 bits per one pixel is output from 12 output ports respectively, one bit by one bit, at every one cycle of the pixel clock.

Specifically, as shown in FIG. 4(*a*), the output of one bit of a pixel signal that is constituted by predetermined bits (n+1) bits, such as 12 bits, is supplied in such a manner that data 0, data 1, data 2, data 3, . . . , etc. are supplied sequentially, one bit per one pixel, to each of the input terminals 21-0 to 21-n.

Then, in synchronization with this pixel signal, a pixel clock is supplied to the input terminal 24, as shown in FIG. 4(*b*). This pixel clock indicated by FIG. 4(*b*) is a clock of 1 cycle per 1 pixel.

When such a pixel signal is input into the output unit 20 in the state where the 1SDR output mode is set, the pixel signals obtained at the input terminals 21-0 to 21-n are selected by the selector 31 so as to be output from the first series of output ports 22*a*-0 to 22*a*-n, as shown in FIG. 4(*c*). It should be noted that the timing is delayed by one pixel in the example of FIG. 4(*c*). Up to this point, the operation is the same as that of the 1DDR output mode.

Then, the pixel clock that is output from the output port 28 is selected by the selector 27 so that the pixel clock that is input to the output unit 20 is output without changing the frequency, as shown in FIG. 4(*d*). In this example, the pixel data change in association with the rise of the clock, as shown in FIGS. 4(*c*) and 4(*d*).

Next, an example in which a signal is output using the 2SDR output mode is described with reference to FIG. 5. The 2SDR output mode is a mode of an output format in which the pixel signal of 12 bits per one pixel is output from 24 output ports respectively, one bit by one bit, at every 2 cycles of the pixel clock. Although this 2SDR output mode requires two times as many output ports as those of the 1SDR output mode and the 1DDR output mode, the transfer rate per one port becomes ½.

In this case as well, as shown in FIG. 5(c), the output of one bit of a pixel signal that is constituted by predetermined bits (n+1) bits, such as 12 bits, is supplied in such a manner that data 0, data 1, data 2, data 3, . . . , etc. are supplied sequentially, one bit per one pixel, to each of the input terminals 21-0 to 21-n.

In synchronization with this pixel signal, a pixel clock is supplied to the input terminal 24, as shown in FIG. 5(a). This pixel clock indicated by FIG. 5(a) is a clock of 1 cycle per 1 pixel, and a clock having ½ the frequency is generated by the frequency divider 26, as shown in FIG. 5(b).

Then, the 2SDR conversion circuit 32 allocates the pixel signal obtained in FIG. 5(c) sequentially, one bit by one bit, into two series of signals, the first series of signals (the even numbered signals) shown in FIG. 5(d) and the second series of signals (the odd numbered signals) shown in FIG. 5(e). When the signal is merely allocated in this way, the phases of the two series of pixel signals are shifted. Therefore, the signals are delayed to generate the first series of pixel data 2SDR_DT0 and the second series of pixel data 2SDR_DT1, in which the timings of both signals match, as shown in FIGS. 5(g) and 5(h).

A selection process is performed in the selectors 31 and 27 so that the first series of pixel data 2SDR_DT0 and the second series of pixel data 2SDR DT1 shown in FIGS. 5(g) and 5(h) are output in synchronization with the pixel clock shown in FIG. 5(h) (the same as the clock of FIG. 5(b)).

According to the configuration of this embodiment, one image sensor 10 can make a selection between the 1DDR output mode shown in FIG. 3, the 1SDR output mode shown in FIG. 4, and the 2SDR output mode shown in FIG. 5, and it can be incorporated into an imaging apparatus (camera) that supports any of the output modes. Therefore, a common image sensor can be used as the image sensing means even when the circuit of the camera side supports any of the output modes, so the versatility of the image sensor improves. In particular, in the case of the 2SDR output mode, the transfer rate per one port can be reduced to ½ of the other modes, although the number of the output ports becomes two times larger, so it is suitable for the case where there is a limitation on the transfer rate at which the camera side can receive the signal.

Moreover, the configuration of this embodiment can be achieved by a relatively simple configuration of providing a circuit for allocating pixel signals of respective bits for the 2SDR output mode, a clock conversion circuit, and a selector for selecting them. Accordingly, making the image sensing device capable of handling the multiple output modes as in this embodiment does not complicate the circuit configuration of the image sensor to a great degree, and it can be achieved by a simple configuration.

Next, an example of a second embodiment of the invention will be described with reference to FIGS. 6 and 7.

The example of this embodiment employs a configuration in which a 4SDR output mode can be selected other than the 1DDR output mode, the 1SDR output mode, and the 2SDR output mode.

This embodiment is an embodiment in which the invention is applied to a solid-state image sensing device in which a CMOS image sensor is used as an image sensor (solid-state image sensor element). The overall configuration of the image sensor is the same as the configuration of FIG. 1 in the previously described first embodiment, but the configuration of the output unit 20 is changed to the configuration shown in FIG. 6.

Specifically, referring to FIG. 6, input terminals 121-0 to 121-n (n is the integer corresponding to the bit number) are the terminals to which the pixel signals are supplied from the signal processing unit 15 (FIG. 1) in the image sensor 10. In this example as well, the pixel signal for one pixel is composed of 12 bits, n is 11, and 12 input terminals 121-0 to 121-11 are provided. A signal of 1 bit position of the pixel signal for one pixel is supplied sequentially to each of the input terminals 121-0 to 121-n.

The pixel signals obtained at the input terminals 121-0 to 121-n are subjected to a conversion process and a selection process in data selecting units 130-0 to 130-n. Although only the configuration of the data selecting unit 130-0 is shown in FIG. 6, the other data selecting units 130-1 to 130-n also have the same configuration.

The configuration of the data selecting unit 130-0 is as follows. The pixel signal obtained at the input terminal 121-0 is supplied to a selector 131, a 2SDR conversion circuit 132, and a 4SDR conversion circuit 133. The 2SDR conversion circuit 132 is a conversion circuit that functions as an allocating unit for alternately allocating the supplied pixel signals sequentially, one bit by one bit, into two channels of bit data 2SDR_DT0 and 2SDR_DT1 so that the supplied pixel signals are converted into 2SDR output format signals.

The 4SDR conversion circuit 133 is a conversion circuit that functions as an allocating unit for alternately allocating the supplied pixel signals sequentially, one bit by one bit, into four channels of bit data 4SDR DT0, 4SDR DT1, 4SDR DT2, and 4SDR DT3 so that the supplied pixel signals are converted into 4SDR output format signals.

The two channels of bit data 2SDR_DT0 and 2SDR_DT1 allocated by the 2SDR conversion circuit 132 are supplied to the selector 131. The four channels of bit data 4SDR DT0, 4SDR DT1, 4SDR DT2, and 4SDR DT3 allocated by the 4SDR conversion circuit 133 are also supplied to the selector 131.

The selector 131 has output ports 122a-0, 122b-0, 122c-0, and 122d-0. Each of the output ports 122a-0, 122b-0, 122c-0, and 122d-0 is an output port that is provided for the image sensor (solid-state image sensing device) 10. In FIG. 6, a first series of output ports of the data selecting units 130-0 to 130-n are denoted as output ports 122a-0, 122a-1, . . . and 122a-n, respectively. Likewise, a second series of output ports of the data selecting units 130-0 to 130-n are denoted as output ports 122b-0, 122b-1, . . . and 122b-n, respectively. Likewise, a third series of output ports of the data selecting units 130-0 to 130-n are denoted as output ports 122c-0, 122c-1, . . . and 122c-n, respectively. Likewise, a fourth series of output ports of the data selecting units 130-0 to 130-n are denoted as output ports 122d-0, 122d-1, . . . and 122d-n, respectively.

When the 1DDR output mode or the 1SDR output mode is selected as the output mode, only the first series of output ports 122a-0 to 122a-n are used to output the pixel signals. When the 2SDR output mode is selected as the output mode, both the first series of output ports 122a-0 to 122a-n and the second series of output ports 122b-0 to 122b-n are used to output the pixel signals. In addition, when the 4SDR output mode is selected as the output mode, the first series of output ports 122a-0 to 122a-n, the second series of output ports 122b-0 to 122b-n, the third series of output ports 122c-0 to 122c-n, and the fourth series of output ports 122d-0 to 122d-n are used to output the pixel signals. In the selector 131, when adjustment of the output timing is necessary, a process for adjusting the output timing of the pixel signals by delay or the like is performed as needed.

Selection of these output modes is controlled by a signal obtained at an output-mode-specifying-signal input terminal 123. Specifically, an output mode specifying signal obtained at the input terminal 123 is supplied to the selector 131 of each of the data selecting units 130-0 to 130-n so that the signal of the corresponding mode can be output. In the case of this example, one output mode among the four output modes is selected, so the output mode specifying signal obtained at the input terminal 123 is constituted by a signal of 2 bits.

In addition, a pixel clock is output from an output port 128 in synchronization with the outputs from the respective output ports of the pixel signals.

Accordingly, a clock input terminal 124, to which the pixel clock is supplied from the pixel clock generating unit (not shown) in the image sensor 10, is provided, and the pixel clock is supplied to a frequency divider 126 so that it is converted into a clock having ½ the frequency. The frequency division operation of the frequency divider 126 is performed based on the result obtained by identifying the output mode specifying signal obtained at the input terminal 123 using a mode identifying unit 125. Specifically, the frequency divider 126 is allowed to operate only in the case that the mode identifying unit 125 determines that the output mode is an output mode that requires the clock having ½ the frequency. Alternatively, the frequency divider 126 may be allowed to operate at all times.

Then, a selector 127 makes a selection between a mode of outputting the clock obtained at the clock input terminal 124 from the output port 128 as it is and a mode of outputting the clock whose frequency is divided into ½ or ¼ by the frequency divider 126 from the output port 128. The selection by the selector 127 is performed based on the output mode specifying signal obtained at the input terminal 123.

Next, examples of the output states in the respective output modes are described.

The output states of the 1DDR output mode, the 1SDR output mode, and the 2SDR output mode are the same output states as described in the first embodiment with reference to FIGS. 3 to 5, and the description thereof will be omitted here.

When the 4SDR output mode is selected, the output is performed in the state shown in FIG. 7.

The output state of FIG. 7 is described below. The output by the 4SDR output mode is a mode of an output format in which the pixel signal of 12 bits per one pixel is allocated to 48 output ports and output therefrom, one bit by one bit, at every 4 cycles of the pixel clock. Although this 4SDR output mode requires four times as many output ports as those of the 1SDR output mode and the 1DDR output mode, the transfer rate per one port becomes ¼.

In this case as well, as shown in FIG. 7(d), the output of one bit of a pixel signal that is constituted by predetermined bits (n+1) bits, such as 12 bits, is supplied in such a manner that data 0, data 1, data 2, data 3, . . . , etc. are supplied sequentially, one bit per one pixel, to each of the input terminals 121-0 to 121-n.

In synchronization with this pixel signal, a pixel clock is supplied to the input terminal 124, as shown in FIG. 7(a). This pixel clock indicated by FIG. 7(a) is a clock of 1 cycle per 1 pixel. A clock having ½ the frequency is generated by the frequency divider 126, as shown in FIG. 7(b), and further, a clock having ¼ the frequency is generated, as shown in FIG. 7(c).

Then, the 4SDR conversion circuit 133 allocates the pixel signal obtained in FIG. 7(d) sequentially, one bit by one bit, into four series of signals, the first series of signals shown in FIG. 7(e), the second series of signals shown in FIG. 7(f), the third series of signals shown in FIG. 7(g), and the fourth series of signals shown in FIG. 7(h). When the signal is merely allocated in this way, the phases of the four series of pixel signals are shifted. Therefore, the signals are delayed to generate the first series of pixel data 4SDR DT0, the second series of pixel data 4SDR DT1, the third series of pixel data 4SDR DT2, and the fourth series of pixel data 4SDR DT3, in which the timings of the signals match, as shown in FIGS. 7(i) and 7(l).

A selection process is performed in the selectors 131 and 127 so that the respective series of pixel data shown in FIGS. 7(i) through 7(l) are output in synchronization with the pixel clock shown in FIG. 7(m) (the same as the clock of FIG. 7(c)).

This embodiment of the second embodiment makes it possible to output the signal using the 4SDR output mode. Therefore, the transfer rate can be further lowered, and the invention can be applicable even in the case that the restriction on the transfer rate is more severe.

It should be noted that although not shown in the drawings, it is also possible to further lower the transfer rate by applying the configuration principle of the second embodiment, for example, by allocating the signal into eight series of output ports in synchronization with a clock having ⅛ the frequency.

In the configuration shown in FIG. 6, the 2SDR conversion circuit 132 and the 4SDR conversion circuit 133 are prepared for the data selecting units 130-0 to 130-n, so that the conversion processes for the respective modes are performed by the respective circuits. However, as shown in FIG. 8, a 2/4SDR conversion circuit 134 may be prepared for performing the conversion process for the 2SDR output mode and the conversion process for the 4SDR output mode by a common circuit, and the conversion operation in the conversion circuit 134 may be switched by an output mode specifying signal, for example. The rest of the portion in FIG. 8 are the same configuration as that of FIG. 6.

According to the configuration of FIG. 8, the configuration of the data conversion circuit can be made simpler corresponding to the provision of the common conversion circuit.

Although the foregoing embodiments describe examples in which a CMOS image sensor is used as the image sensor, it is of course possible to apply the invention to various other image sensors configured to be other types of solid-state image sensing devices, such as CCD type image sensors.

DESCRIPTION OF REFERENCE NUMERALS

10 . . . image sensor; 11 . . . sensor unit; 11a . . . pixel; 12 . . . drive circuit; 13 . . . control unit; 14 . . . analog/digital converter; 15 . . . signal processing unit; 20 . . . output unit; 23 . . . output-mode-specifying-signal input terminal; 24 . . . clock input terminal; 25 . . . mode identifying unit; 26 . . . frequency divider; 27 . . . selector; 28 . . . output port; 30-0, 30-1, 30-n . . . data, selecting unit; 31 . . . selector; 32 . . . 2SDR conversion circuit; 123 . . . output-mode-specifying-signal input terminal; 124 . . . clock input terminal; 125 . . . mode identifying unit; 126 . . . frequency divider; 127 . . . selector; 128 . . . output port; 130-0, 130-1, 130-n . . . data selecting unit; 131 . . . selector; 132 . . . 2SDR conversion circuit; 133 . . . 4SDR conversion circuit; 134 . . . 2/4SDR conversion circuit

The invention claimed is:

1. A solid-state image sensing device comprising:
a clock converting unit for converting a clock into a converted clock having a frequency that is a fraction of the clock;
an allocating unit for allocating bit data of the pixel signal obtained by imaging into at least two series of bit data, in synchronization with the converted clock;
a first selector for selecting an output that is either data that has been allocated by the allocating unit and bit data that has not been allocated by the allocating unit;

a second selector for selecting an output having either a frequency that has been converted by the clock converting unit or a frequency that has not been converted by the clock converting unit;

wherein pixel signals that are output at the same transfer rate can be output in synchronization with clocks having different frequencies, and an output mode in which the first selector selects an output of bit data that have not been allocated and the second selector selects a clock converted by the clock converting unit having a frequency of ½ times the clock that has not been converted, the clock converting unit further converts the clock into a clock having a frequency of ¼ times the clock that has not been converted;

the allocating unit further alternately allocates the signal into four series of bit data;

the first selector makes a selection between one series of bit data, bit data allocated into two series, and bit data allocated into four series; and the second selector makes a selection between a clock having a frequency that has not been converted, a clock having a frequency of ½ times the clock that has not been converted, and a clock having a frequency of ¼ times the clock that has not been converted.

2. An image signal outputting circuit comprising:

a clock converting unit for converting a clock into a clock that is a fraction of the clock;

an allocating unit for alternately allocating bit data of the pixel signal, obtained by imaging into at least two series of bit data, in synchronization with the clock converted by the clock converting unit;

a first selector for making a selection between bit data that have been allocated by the allocating unit and bit data that have not been allocated by the allocating unit;

a second selector for selecting an output between a clock having a frequency that has been converted by the clock converting unit and a clock having a frequency that has not been converted by the clock converting unit; and an output mode control unit for specifying the output modes at the first and second selectors, wherein pixel signals that are output at the same transfer rate can be output in synchronization with clocks having different frequencies, wherein:

an output mode in which the first selector selects an output of bit data that have not been allocated and the second selector selects a clock converted by the clock converting unit and having a frequency of ½ times the clock that has not been converted, is prepared as the output mode specified by the control unit, wherein the clock converting unit further converts the clock into a clock having a frequency of ¼ times the clock that has not been converted;

the allocating unit further alternately allocates the signal into four series of bit data;

the first selector makes a selection between one series of bit data, bit data allocated into two series, and bit data allocated into four series; and the second selector makes a selection between a clock having a frequency that has not been converted, a clock having a frequency of ½ times the clock that has not been converted, and a clock having a frequency of ¼ times the clock that has not been converted.

* * * * *